United States Patent [19]
Suzuki et al.

[11] Patent Number: 5,652,752
[45] Date of Patent: Jul. 29, 1997

[54] MOBILE RADIO COMMUNICATION SYSTEM EMPLOYING TIME DIVISION MULTIPLE TRANSMISSION SCHEME

[75] Inventors: Toshiro Suzuki, Tama; Arata Nakagoshi, Kokubunji; Takao Harakawa, Fujisawa; Izumi Horikawa, Yokohama; Takakuni Kuki, Tokyo, all of Japan

[73] Assignee: Hitachi, Ltd., Tokyo, Japan

[21] Appl. No.: 406,478

[22] Filed: Mar. 20, 1995

[30] Foreign Application Priority Data

Mar. 18, 1994 [JP] Japan .................... 6-048317

[51] Int. Cl.$^6$ ............... H04B 7/212; H04B 7/26
[52] U.S. Cl. ............ 370/330; 370/337; 370/347; 370/500; 455/524
[58] Field of Search ............... 370/95.3, 95.1, 370/110.1, 98, 85.6, 111, 82, 105.1, 50; 455/33.1, 54.1, 54.2, 58.1, 33.4, 56.1; 379/59, 60

[56] References Cited

U.S. PATENT DOCUMENTS

| | | | |
|---|---|---|---|
| 5,321,690 | 6/1994 | Sato | 370/95.3 |
| 5,390,366 | 2/1995 | Kasugai | 370/95.3 |
| 5,420,851 | 5/1995 | Seshadri et al. | 370/95.1 |
| 5,430,774 | 7/1995 | Dupuy | 455/54.1 |
| 5,448,570 | 9/1995 | Toda et al. | 370/95.3 |

FOREIGN PATENT DOCUMENTS 93015565  8/1993  European Pat. Off. ....... 370/95.3

OTHER PUBLICATIONS

"Personal Handy Phone System", RCR Standard, Version 1, RCR STD-28, Research & Development Center for Radio Systems (RCR), Dec. 20, 1993, pp. 1-103.
FCC, Part 15 Rules DA93-1278, Oct. 22, 1993, §15. 323 (c) –(1).

Primary Examiner—Alpus H. Hsu
Assistant Examiner—Seema S. Rao
Attorney, Agent, or Firm—Evenson, McKeown, Edwards & Lenahan P.L.L.C.

[57] ABSTRACT

In a mobile radio communication system employing a time-division multiple transmission scheme, having a plurality of base stations and a plurality of personal stations, an arbitrary base station, when detecting a pilot signal transmitted from any master base station in the mobile radio communication system, acts as a slave base station which does not transmit its pilot signal but transmits and receives a common control signal to and from a personal station utilizing a frequency channel occupied by the pilot signal. On the other hand, when not receiving the pilot signal, the base station searches for an available frequency channel, and acts as a master base station which transmits its pilot signal on the available frequency channel to occupy the frequency channel, and transmits and receives the common control signal to and from a personal station on that frequency channel.

19 Claims, 8 Drawing Sheets

MOBILE RADIO COMMUNICATION SYSTEM EMPLOYING TIME DIVISION MULTIPLE TRANSMISSION SCHEME

The present application relates to subject matter described in application Ser. No. 08/350,664 filed Dec. 7, 1994 entitled, now U.S. Pat. No. 5,586,122, "Time Division Multiple Access Mobile Wireless Telecommunications System", the disclosure of which is hereby incorporated by reference.

BACKGROUND OF THE INVENTION

The present invention relates to a mobile radio communication system employing a time division multiple transmission scheme.

Conventionally, as described in a publication entitled "PERSONAL HANDY PHONE SYSTEM, RCR STANDARD (PROPOSAL), VERSION 1" edited by Research & Development Center for Radio System and issued Dec. 20, 1992, particular slots in a frame are only used to transmit a common control signal.

If a variety of radio communication systems are simultaneously operated in the same communication area in the same frequency band, the systems possibly interfere with each other in communications. For this reason, in order to permit a variety of radio communication systems to operate in the same communication area in the same frequency band, it is necessary to perform carrier sense, before a station belonging to one of the systems transmits a radio wave, for confirming whether or not the frequency of the radio wave and time-divided channels at that frequency are currently being utilized by any other system for communications in the area to confirm that an empty channel is still available at that frequency and start communications on that empty channel.

The carrier sense lasting about 10 milliseconds (ms) performed before a station emits a radio wave is described in FCC, Part 15 Rules DA93-1278, Oct. 22, 1993, §15. 323 (c)–(1).

However, even if a radio communication system starts communications on the confirmed empty channel at that frequency, this radio communication system could be interfered by an invasion of communication signals generated by another radio communication system which would start communications in the same frequency band after the former radio communication system has started the communications. Even if the former radio communication system continues the communications while continuously performing the carrier sense after it has started the communications in order to avoid such interference, since the carrier sense is performed only for a short time of approximately 10 ms, a radio communication system which transmits information with a frame of a longer time than the carrier sense period, i.e., 10 ms, may not be detected within the carrier sense period. Consequently, this allows the other radio communication system to invade the same frequency band, whereby the interference similar to the above cannot be prevented.

Also, in a radio communications system which provides a plurality of cells, each of which defines a communication area for a base station, a common control signal for commonly controlling the plurality of cells is required to enable personal stations to easily and rapidly capture the common control signal, even if the personal stations move from a cell to another. For achieving this requirement, the common control signal need be transmitted among these cells on a channel at the same frequency but in different time slots.

However, when all time slots at a certain frequency, which is supposed to be assigned to the common control signal, have already been occupied by another communication system in a cell, the whole radio communication system is prohibited from utilizing the frequency. For avoiding such inconvenience, a plurality of carrier frequencies may be provided such that an available frequency is selected among them for use in communications. This approach, however, forces personal stations to search different frequencies for their common control signal, with the result that excessively long time is required to detect the common control signal.

U.S. patent application Ser. No. 08/350,664, now U.S. Pat. No. 5,586,122, which is a related to the present application, describes an approach for preventing invasion from other radio communication systems, as described above, wherein a pilot signal is transmitted for claiming a priority right, i.e., claiming that a channel assigned to a base station belonging to a system is currently in use so that other radio communication systems cannot invade it to ensure the channel, such that stable communications are maintained.

However, if respective base stations belonging to various radio communication systems transmit their respective pilot signals to attempt to occupy a channel, the respective base stations transmit their own pilot signals on different channels from each other. The same is also applied to even base stations belonging to adjacent cells in the same radio communication system. In such a situation, although the communications can be controlled on a single channel because these base stations are located in adjacent cells in the same system, a plurality of channels are occupied by them. As a result, not only personal stations are obliged to spend longer time for a search for capturing the common control signal, but also resources including limited frequencies and time slots assigned to the communications are spent for nothing. Apparently, this circumstance is not favorable in view of the whole communication system.

SUMMARY OF THE INVENTION

It is an object of the present invention to provide a mobile radio communication system employing a time division multiple transmission scheme which is capable of stably continuing communications, without being invaded or interfered by other radio communication systems, even if the radio communication system utilizes a frame having a length longer than a carrier sense time.

It is another object of the present invention to provide a mobile radio communication system employing a time division multiple transmission scheme including a plurality of cells which is capable of rapidly and stably controlling communications in the entire system even if the same channel at the same carrier frequency for the mobile radio communication system is being occupied in a cell by any other radio communication system or any other base station in the same radio communication system.

According to the system of the present invention, each base station receives a pilot signal from each adjacent base station belonging to the same radio communication system, and acts as a master station and transmits its own pilot signal in order to prevent other radio communication systems from invading the same channel only when the received pilot signal has a level lower than a predetermined threshold. Conversely, if the received pilot signal has a level higher than the predetermined threshold, the base station acts as a slave base station which does not transmit its pilot signal and utilizes an empty time slot in a communication channel occupied by the pilot signal transmitted from the master station to transmit a common control signal.

According to another aspect of the mobile radio communication system employing a time division multiple transmission scheme of the present invention, each base station switches a plurality of previously defined and registered carrier frequencies in a time sequential manner so as to transmit a common control signal of the same contents at each of the registered carrier frequencies. In addition, the time division multiple scheme is employed such that the same frequency is not requested at the same time by adjacent base stations in the same radio communication system, thus ensuring each base station to communicate the common control signal through either carrier frequency even if the base station is prohibited from utilizing a particular carrier frequency.

DESCRIPTION OF THE PREFERRED EMBODIMENTS

Embodiments of the present invention will hereinafter be described in detail with reference to the accompanying drawings.

First Embodiment

This embodiment relates to mobile radio communication system employing a time division multiple transmission scheme which utilizes a pilot signal for controlling communications.

Figure 1:
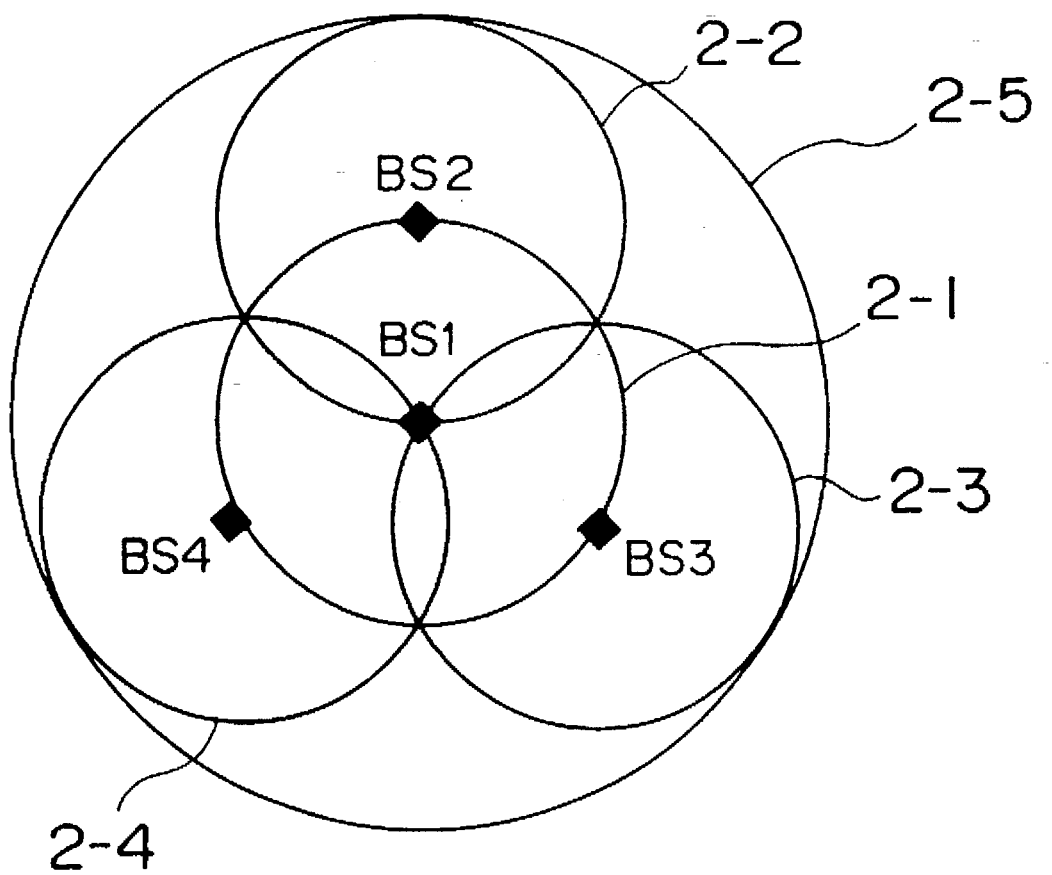
FIG. 1 is an explanatory diagram showing exemplary location of a plurality of base stations in a radio communication system according to the present invention.

FIG. 1 is a base station location diagram showing the location of four base stations in a mobile radio communication system according to this embodiment. Base stations BS1, BS2, BS3, and BS4 has respective communication areas designated reference numerals 2-1, 2-2, 2-3, and 2-4, respectively. The base station BS1 is assumed to be a master base station which transmits a pilot signal. A coverage area of the pilot signal transmitted from this master base station is indicated by a circle, designated reference numeral 2-5. Since the base stations BS2, BS3, and BS4 exist within the coverage area of the pilot signal from the master base station BS1, they act as slave base stations which do not transmit their own pilot signals, and communicate a common control signal with personal stations existing in their respective communication areas.

Figure 2:
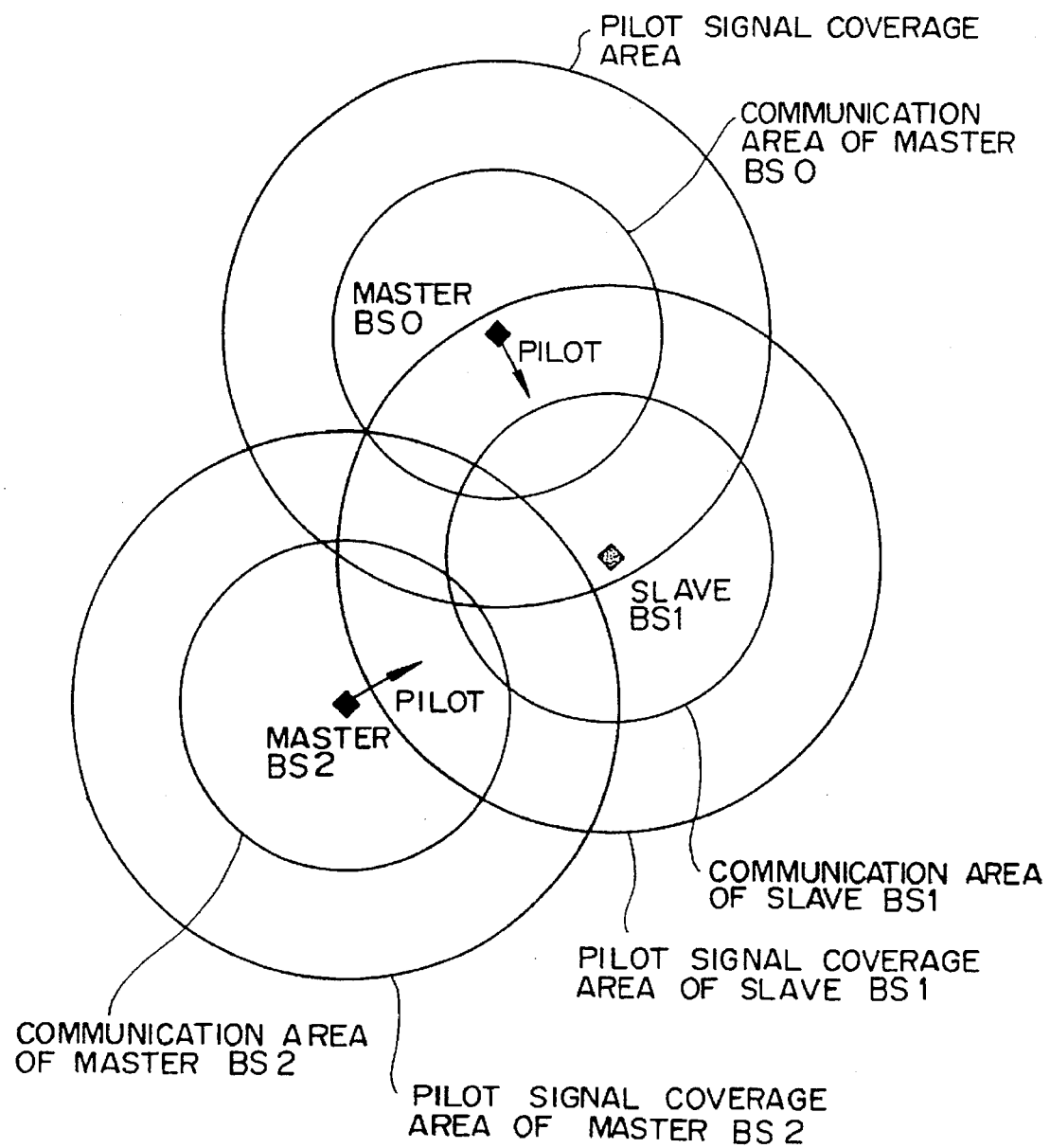
FIG. 2 is an explanatory diagram showing other exemplary location of a plurality of base stations in the radio communication system according to the present invention.

FIG. 2 is a diagram showing another example of the location of three base stations in the mobile radio communication system according to this embodiment. Referring to this example in detail, a base station BS1, which is located within a coverage area of a pilot signal transmitted from a master base station BS0, therefore acts as a slave base station and communicates the common control signal with personal stations in its communication area without transmitting its pilot signal. On the other hand, a base station BS2, which is located out of the coverage area of the pilot signal transmitted from the master base station BS0, acts as a master base station to transmit its pilot signal as well as communicates the common control signal with personal stations in its communication area.

Figure 3:
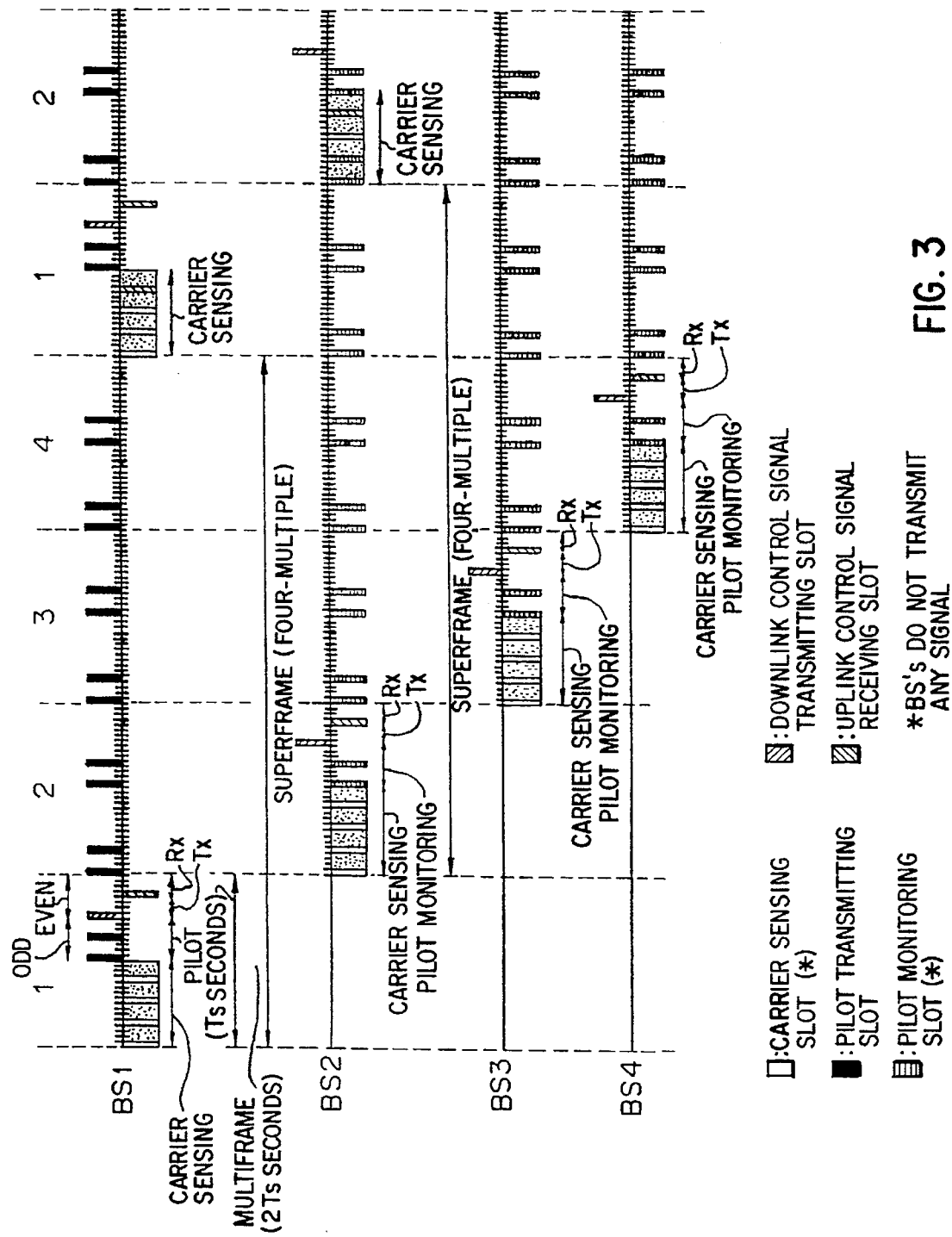
FIG. 3 is timing charts showing an example of the operation performed by the radio communication system according to the present invention.

The structure of a frame according to a communication scheme employed in the mobile radio communication system of this embodiment will be next described with reference to timing charts shown in FIG. 3. FIG. 3 graphically represents timings of transmission and reception of the respective base stations which are located as shown in FIG. 1, wherein the abscissa represents the time axis. The position of each time slot depicted by a bar extending upward from the center line representing the time axis indicates the timing at which each base station transmits a communication signal, while the position of each time slot depicted by a bar extending downward from the center line indicates the timing at which each base station receives a communication signal. The kinds of respective communication signals identified by patterns filling the bars are described below the timing charts of FIG. 3.

In the communication scheme employed in the embodiment shown in FIG. 3, each of the base stations transmits and receives the common control signal in a time slot which is repeated in a cycle of superframe. The superframe consists of four multiframes, each of which consists of two frames having a period of 10 milliseconds (ms). Each frame consists of a pair of sub-frame which has eight time slots. The former sub-frame is called an odd-frame, while the latter sub-frame is called an even-frame. Each of these odd-frame and even-frame comprises a downlink slot group having four time slots and an uplink slot group also having four time slots. The downlink time slot is provided for transmitting the common control signal from a base station to personal stations, whereas the uplink time slot is provided for transmitting the common control signal from a personal station to the base station for responding to the common control signal from the base station. It should be noted that the pilot signal may be transmitted not only in the downlink time slot of an odd-frame but also in the uplink time slot of the same frame.

As described above, each frame has a pair of sub-frames each consisting of an odd-frame and an even-frame. The odd-frame is used only for transmitting the pilot signal. When a master base station transmitted a pilot signal in an odd-frame, a time slot in the even-frame corresponding to a time slot in which the pilot signal was transmitted is occupied for transmission of the common control signal. More specifically, when the pilot signal is transmitted in a time slot in an odd-frame, a time slot in an even-frame corresponding to the time slot is reserved, and the common control signal is transmitted or received in a corresponding time slot in the next even-frame.

As shown in FIG. 3, each base station is temporally shifted from adjacent base stations by a period corresponding to one multiframe. Each multiframe consists of two frames, each of which has 16 time slots. Since time slots available for transmitting the pilot signal among these 16 time slots are only eight in the odd frame, a maximum of four master base stations can be managed with a frame. In the example shown in FIG. 3, since four multiframes constitute a superframe, a maximum of 16 base stations, including slave base stations, can be managed with a frequency.

Figure 4:
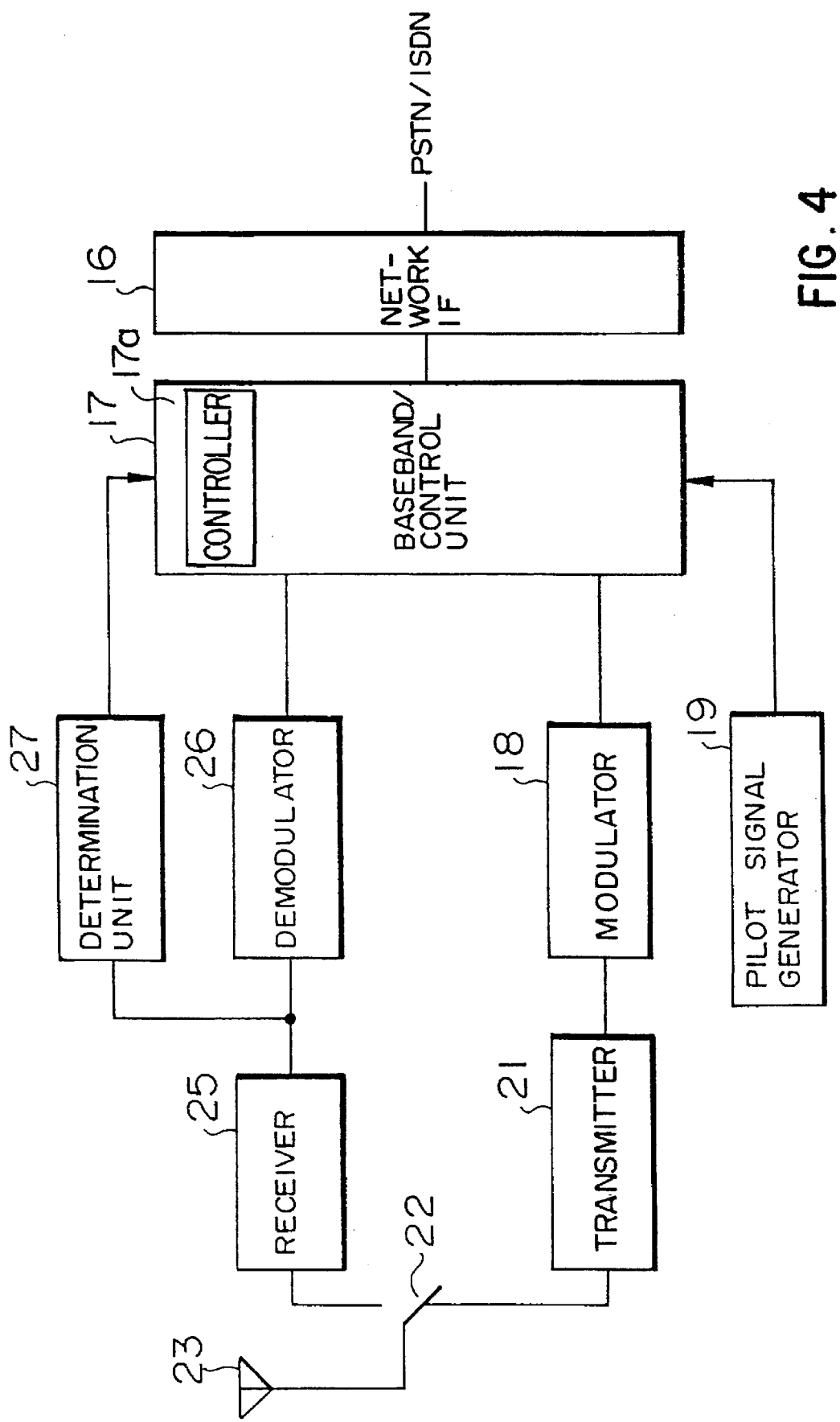
FIG. 4 is a block diagram showing the configuration of an embodiment of the mobile radio communication system according to the present invention.

FIG. 4 is a block diagram showing an example of the configuration of the base station. In FIG. 4, a network interface 16 is connected to a telephone network PSTN/ISDN for coupling a baseband control unit 17 to the telephone network. A pilot signal generator 19 generates the pilot signal serving as a priority claiming signal for utilizing a frequency channel. The baseband control unit 17 is connected to the network interface 16 and to the pilot signal generator 19. The baseband control unit 17 comprises a controller 17a having a memory and a control circuit. The controller 17a performs signal conversion between a transmission signal on the telephone network and information data on a radio communication system as well as generates the common control signal and operates to insert the pilot signal from the pilot signal generator 19 and the common control signal into predetermined time slots. This controller 17a further controls the operation of the whole circuit configuration constituting the base station shown in FIG. 4. Data signals including the common control signal generated by the baseband control unit 17 and the pilot signal are modulated by a modulator 18, for example, in accordance with (π/4) QPSK (π/4 shift quadrature phase-shift keying).

A transmitter 21 converts the data signals modulated by the modulator 18 from the baseband frequency to a transmission frequency, and thereafter transmits the converted data signals through a change-over switch 22 from an antenna 23. The change-over switch 22 is alternately switched between the transmitter 21 side and the receiver 25 side each time an uplink slot period is switched to a down slot period and vice versa by the controller 17a, as show in FIG. 3, i.e., every four time slots.

Thus, in reception, the change-over switch 22 has its contact switched to the receiver 25 side. A received signal is received by the receiver 25, demodulated from a QPSK signal to a data signal by a demodulator 26 and transferred to the base band unit 17. The base band control unit 17 converts the data signal to a transmission signal suitable to the telephone network which is sent onto the telephone network through the network interface 16.

A determination unit 27 checks whether or not a radio wave at the received frequency has reached a predetermined magnitude based on the signal received by the receiver 25. In other words, the determination unit 27 determines whether or not the pilot signal or other required radio waves have been received. If it is confirmed that a received signal exists, this fact is informed to the controller 17a. The determination unit 27 comprises a rectifier circuit and a comparator circuit for comparing a voltage rectified by the rectifier circuit with a predetermined reference value.

Next, the operation of the controller 17a in FIG. 4 will be described in connection with a flow chart shown in FIG. 5.

Figure 5:
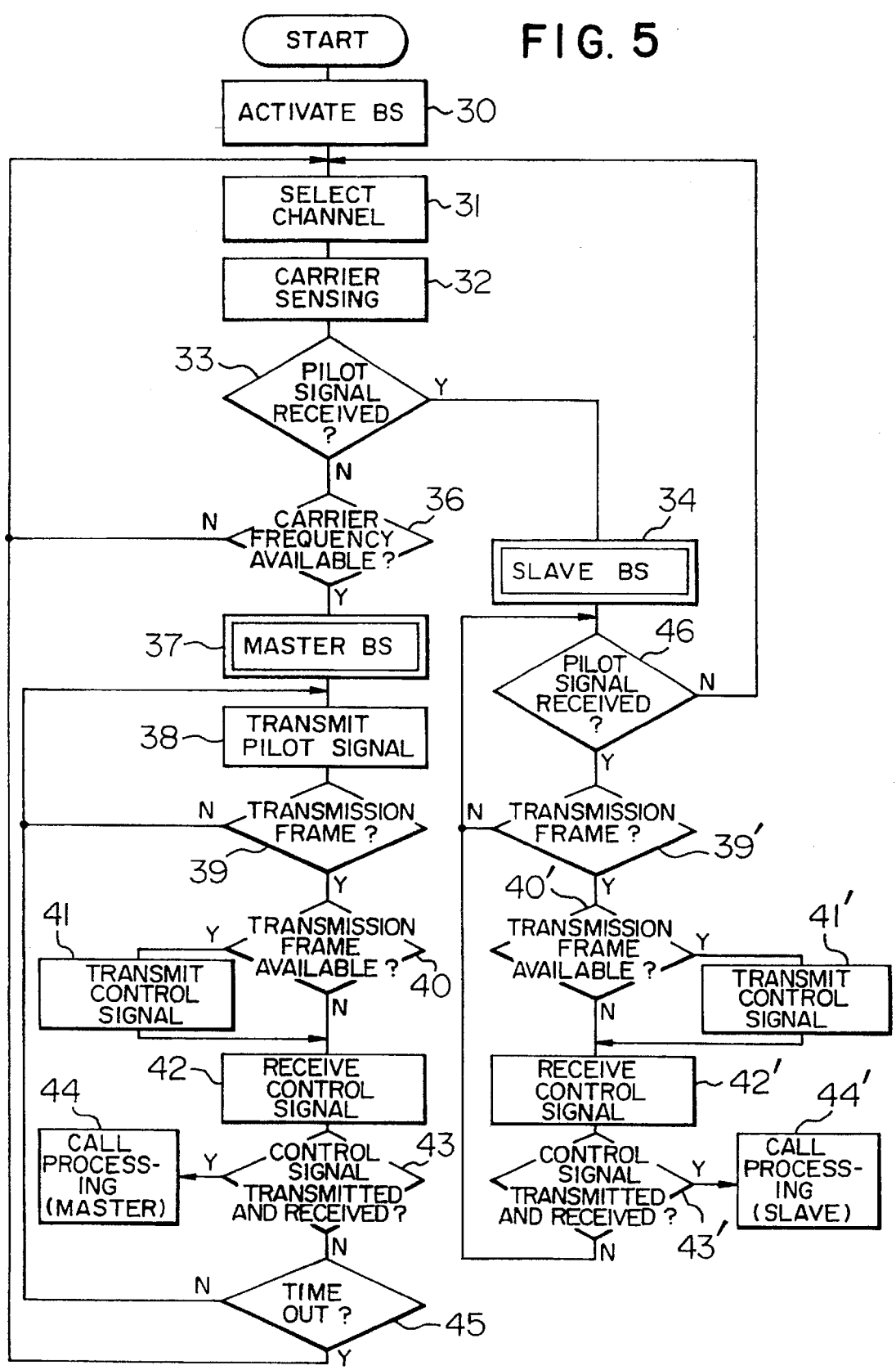
FIG. 5 is a flow chart representing the operation performed by the system shown in FIG. 4 in accordance with the timing charts of FIG. 3.

When power supply is turned on in any base station, the controller 17a of the base station is activated at step 30 in the flow chart of FIG. 5. This flow is initiated at intervals of the multiframe, i.e., every 20 ms. The controller 17a has a plurality of frequencies with the priority order determined thereto registered in its memory. At step 31, the frequency with the highest priority is read from those frequencies and set in the controller 17a. In addition, a predetermined time slot identifier in the frequency is specified to select and set a channel. At step 32, signals of the selected channel is received by the receiver 25 for a 10 ms frame period denoted "carrier sense" in FIG. 3, and the determination unit 27 checks whether a radio wave exists in the channel. Stated another way, step 32 checks whether a channel desired by a base station to utilize has already been occupied by another master base station of the same system or by another radio communication system, and whether the signal level of a signal transmitted on the channel, even when it has been occupied, is equal to or less than a defined Value. At step 33, when the result of the carrier sense indicates that the pilot signal of the radio communication system has been received, the base station is set as a slave base station which itself does not transmit the pilot signal.

On the other hand, if determination is made at step 33 that the pilot signal of the radio communication system has not been received, it is checked at step 36 whether or not the carrier frequency is available. If determination is made here that the carrier frequency is not available, the flow returns to step 31. Conversely, if the carrier frequency is determined to be available at step 36, this base station is set as a master base station at step 37.

Referring back to FIG. 3, the master base station inserts the pilot signal into predetermined two time slots, i.e., the first and fifth time slots in the example of FIG. 3, in each odd-frame of all frames except for a carrier sense period, and transmits the pilot signal in these time slots. Also, the master base station occupies the first and fifth time slots of each even-frame for transmitting and receiving the common control signal of the radio communication system to which the master base station belongs. Then, at step 39, it is determined whether or not a current time slot is of a transmission frame. If NO is determined here, the flow loops back to step 39, where the master base station awaits, while periodically transmitting the pilot signal, until determination is made that a current time slot is of a transmission frame. If so determined at step 39, it is checked at step 40 whether the transmission frame is available, i.e., whether its time slots are being utilized by another base station of the same radio communication system or another radio communication system for communications. If the transmission frame is determined to be available at step 40, the master base station transmits the common control signal at step 41. In this event, the master base station also continues the periodical transmission of the pilot signal. In the example of FIG. 3, the transmission timing of the common control signal is at the first time slot of the even-frame in the latter frame of the first multiframe.

It should be noted that each base station, for example, BS1, utilizes the former 10 ms of the first multiframe for carrier sense, upon activation, in order to confirm the availability of a slot for transmitting the common control signal, subsequent to the determination as to the presence or absence of the pilot signal. Thus, in the flow chart of FIG. 5, if a base station is determined to be a master base station upon activation, this means that a transmission frame is also determined with its availability confirmed. Processing associated with the first multiframe in the next and subsequent loops is progressed as described above with reference Go the flow chart of FIG. 5.

If YES is determined at step 40, the master base station (BS1) transmits the common control signal at step 41, and then receives at step 41 the common control signal which may be transmitted to the base station from any personal station located within the communication area of the master base station. In particular, the common control signal is transmitted and received in the fifth time slot of an even-frame corresponding to the fifth time slot of an odd-frame in which the pilot signal was transmitted. If NO is determined at step 40, the master base station only receives the common control signal at step 42.

It is next determined at step 43 whether the common control signal, transmitted from a personal station in response to the reception of the common control signal from the master base station, is adapted to communications in the radio communication system. If the common control signal is determined to be adapted, call processing is executed as the master base station at step 44, resulting in initiating a normal telephone call using a communication channel which has been arranged between the base station and the personal station through the common control signal. If the common control signal is determined to be improper for communications at step 43, the flow proceeds to step 45.

Step 45 is provided for repeatedly executing carrier sense each time a predetermined time period has elapsed. Determination at this step indicates NO when the predetermined time period has not elapsed, followed by the flow returning to step 38, where the pilot signal is again transmitted. If YES is determined at step 45, the flow returns to step 31 to repeat the above steps from the setting of a carrier frequency. This operation is performed for occasionally confirming that a channel currently used by the master base station is correctly occupied. This confirmation is required because the master base station itself transmits the pilot signal, so that it is possible that another radio communication system employing a different communication period invades the channel or another system happens to simultaneously transmits its pilot signal on the channel.

Specifically explaining the foregoing flow steps in connection with a base station BS2 in FIG. 3, by way of example, by carrier sense performed in the second multiframe. The presence of the pilot signal is determined at step 33, and the base station BS2 is set as a slave base station at step 34. It is confirmed at step 46 whether the pilot signal first transmitted from the master base station BS1 has been received. If the reception of the pilot signal is not confirmed here, this base station BS2 cannot act as a slave base station, thus followed by the flow returning to step 31. Conversely, if YES is determined at step 46, the flow proceeds to step 39' to determine whether a current time slot belongs to a transmission frame of the master base station BS1. If YES is determined at step 39', similar operations to those at steps 40–44 are executed at subsequent steps 40'–44' If the current time slot belongs to a transmission frame of a slave base station, the flow returns to step 46 to confirm reception of the pilot signal, instead of performing carrier sense, followed by repeating the operations described above.

Figure 6:
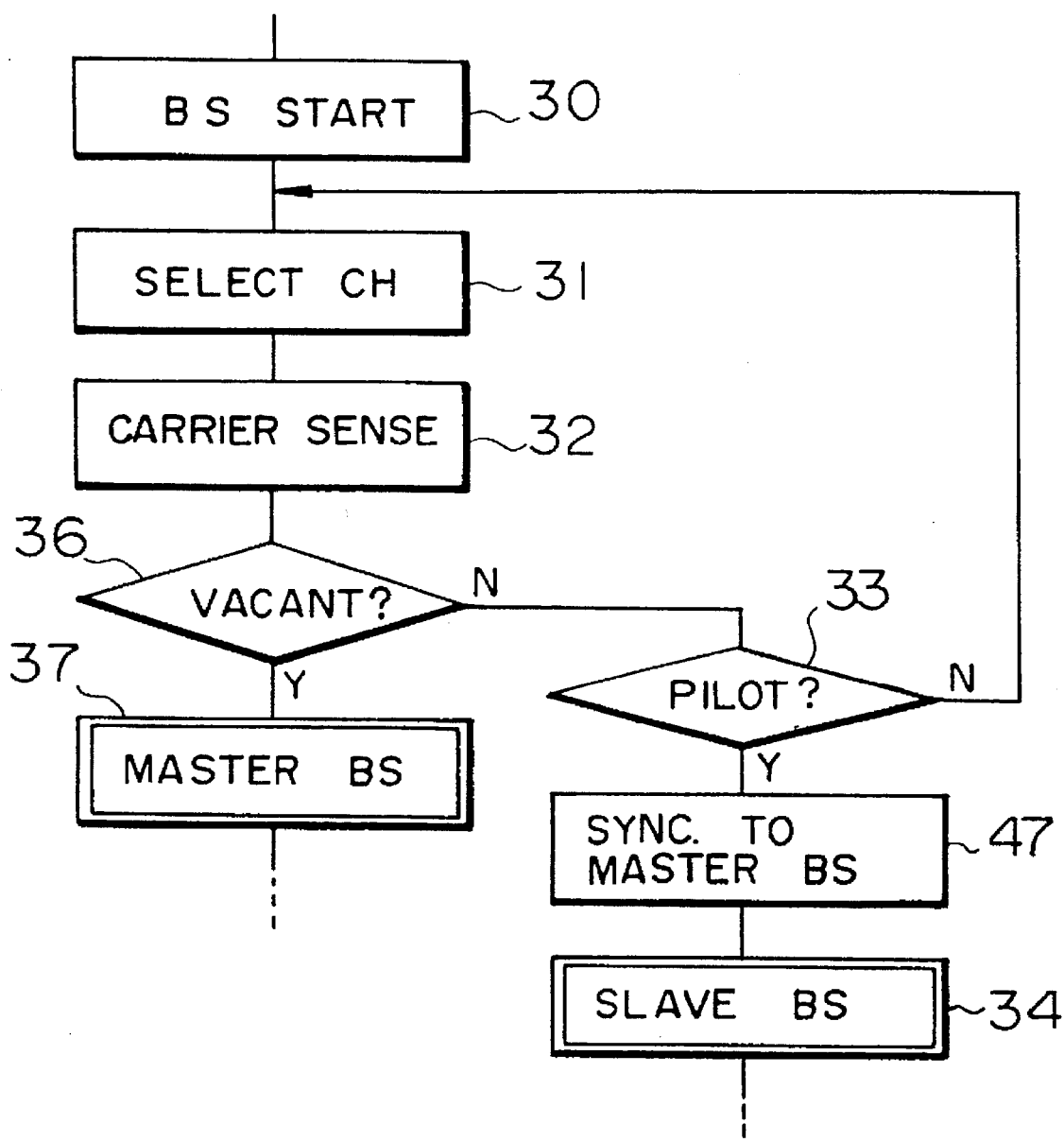
FIG. 6 is a flow chart showing modifications added to part of the flow chart of FIG. 5.

FIG. 6 shows part of the flow chart of FIG. 5 to which some modifications are added. The rest of the flow, not shown in FIG. 6, is the same as FIG. 5. In FIG. 6, when a base station is activated at step 30, a channel is selected at step 31 through a predetermined procedure. More specifically, selected first at step 31 is the frequency with the highest priority within unused frequencies. Then, the channel with the smallest time slot identifier is selected from channels at the selected frequency. Carrier sense is performed at step 32, and it is determined at step 36 whether the result of the carrier sense indicates that the selected channel is available. If YES is determined at step 36, the base station is set as a master base station at step 37. Conversely, if NO is determined at step 36, it is determined at step 33 whether a detected carrier signal is the pilot signal of the radio communication system to which the base station belongs. If NO is determined here, this means that the selected channel has been occupied by another radio communication system, so that the flow returns to step 31 to select another channel. This channel selection is carried out in such a procedure that time slots are sequentially selected in the order of smaller time slot identifiers in the same frequency, and only when all time slots have been occupied in that frequency, the frequency with the next highest priority is selected. If YES is determined at step 33, a received carrier is the pilot signal transmitted from the master base station in the same radio communication system. Therefore, the base station is synchronized to the pilot signal of the master base station at step 47, and then the base station is set as a slave base station at step 34. The synchronization relationship among the slave base stations BS2, BS3, and BS4 is such that they are temporally shifted from adjacent ones by a period corresponding to one multiframe.

Second Embodiment

Figure 7:
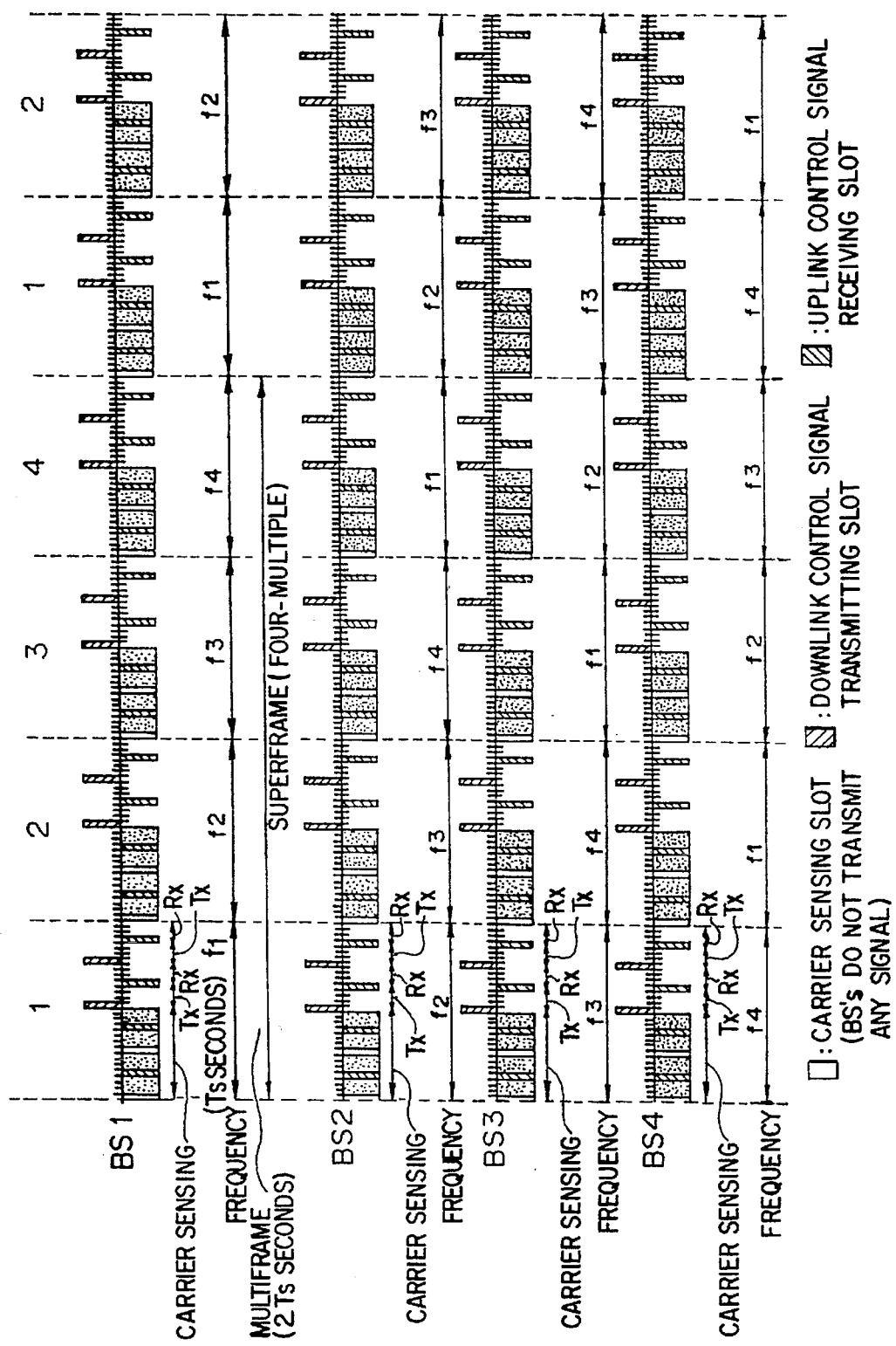
FIG. 7 is timing charts showing another example of the operation performed by the system illustrated in FIG. 4.

While a second embodiment employs an apparatus having the same configuration as that shown in FIG. 4, it differs from the first embodiment in the operation of the controller 17a. According to the second embodiment, four frequencies f1, f2, f3, and f4, by way of example, are sequentially switched in a cycle of multiframe for transmission, as shown in FIG. 7. Since no pilot signal is used, the frequency channel will not occupied by the radio communication system for transmitting the pilot signal. The frame structure employed by the second embodiment is the same as FIG. 3 and includes superframes, multiframes, frames, sub-frames, odd-frames, and even-frames. Base stations BS1, BS2, BS3, and BS4 are temporally shifted as shown in FIG. 7 in order to prevent two or more base stations from selecting the same frequency at the same time. This is a means for preventing simultaneous selection of the same frequency between adjacent base stations. Alternatively, for avoiding such simultaneous selection of the same frequency, a no-transmission time portion, for example, may be inserted when switching a frequency to another. The period of the no-transmission time portion may be equal to one multiframe period or may be longer or shorter than that. The second embodiment is identical to the first embodiment in that each base station, after performing carrier sense with the former frame of a multiframe to confirm an available channel, transmits and receives the common control signal with the latter frame.

Figure 8:
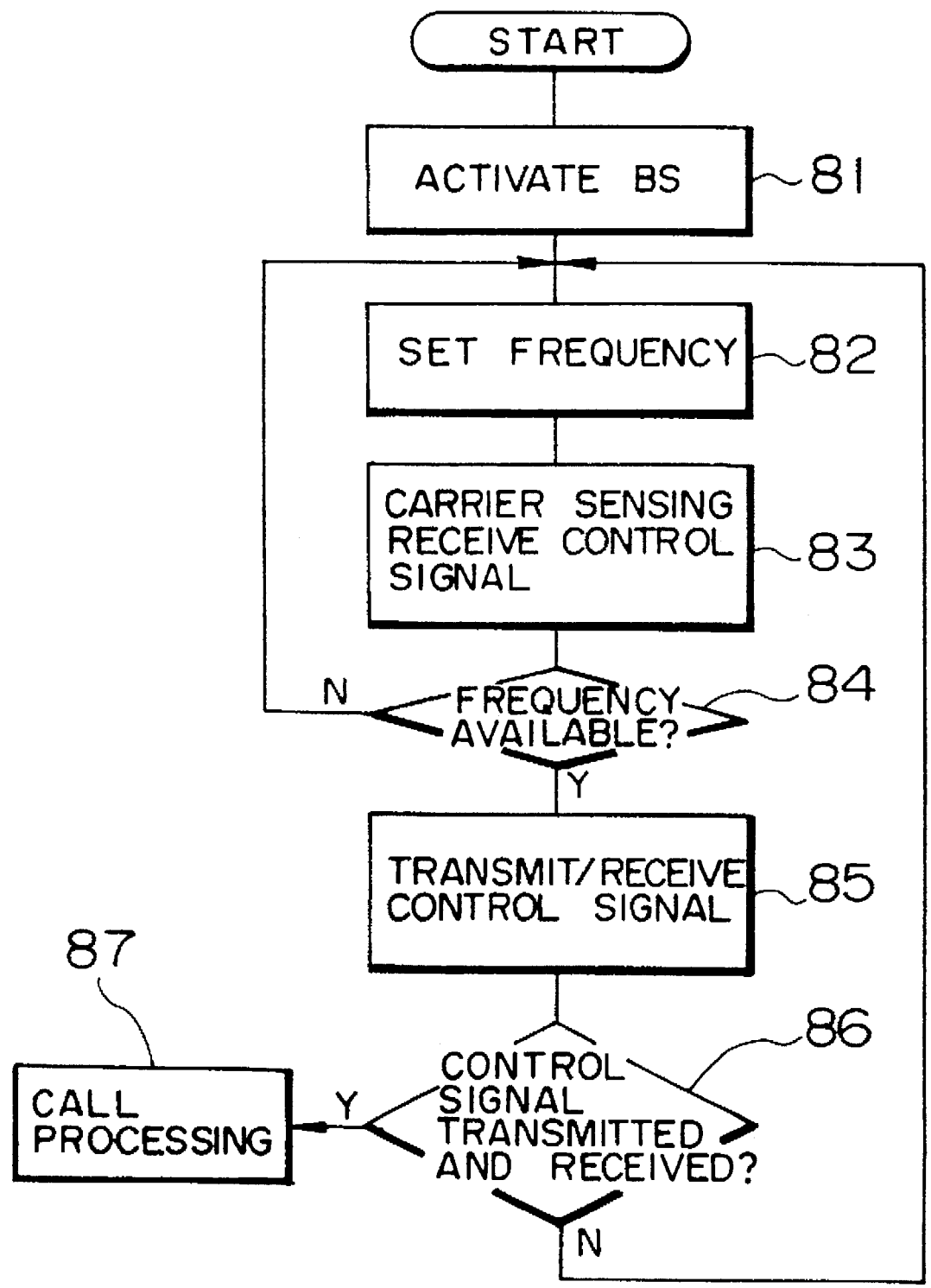
FIG. 8 is a flow chart showing the operation performed by the system illustrated in FIG. 4 in accordance with the timing charts of FIG. 7.

The operation of the embodiment shown in FIG. 7 will be described below with reference to a flow chart of FIG. 8. In FIG. 8, when this flow starts, a base station is activated at step 81, and a first frequency, for example, f1 is set at step 82. Next, carrier sense is performed at the set frequency, and it is checked at step 84 whether or not the result of the carrier sense indicates that the frequency is available. If NO is determined as a result of the check, the flow returns to step 82 to set a second frequency, for example, f2. Conversely, if YES is determined at step 84, the flow proceeds to step 85, where the common control signal is transmitted and received in a predetermined time slot. Then, it is determined at step 86 whether the common control signal has been transmitted and received between the base station and a personal station. If YES is determined here, normal call processing is executed at step 87. Conversely, if NO is determined at step 86, the flow again returns to step 82 to set the third frequency f2, and similar operations to the above are progressed. In this way, the foregoing steps are repeated with the frequencies f1–f4. The operation of the whole radio communication system of this embodiment is performed as represented by FIG. 7.

Thus, if a personal station monitors to receive either one of the frequencies f1–f4, it can receive the common control signal in synchronism with the monitored one of the frequencies f1–f4 which are repeatedly transmitted thereto from the base station. The personal station, after transmitting the common control signal in response to the received common control signal, can start communications with the base station. If the one of the frequencies f1–f4 is interfered during communications, the personal station may switch the interfered frequency to a different frequency and monitor the new frequency. In this way, highly reliable and rapid mobile radio communications can be realized. If it is difficult to establish the synchronization between base stations, the base stations may operate asynchronously with each other by randomly setting a carrier frequency switching period of each base station.

While the present invention has been described in connection with specific embodiments, the present invention is not limited to the foregoing embodiments but may be modified in various ways within the scope defined by the appended claims.

We claim:

1. A mobile radio communication system employing a time-division multiple transmission scheme, including a plurality of personal stations and a plurality of base stations, wherein an arbitrary base station comprises:

frequency channel selecting means for selecting a frequency channel from a plurality of frequency channels in accordance with a predetermined priority order;

pilot signal discriminating means for determining, upon activating said base station, whether or not a signal received on the frequency channel selected by said frequency channel selecting means is a pilot signal transmitted from a different base station acting as a master base station within a mobile radio communication system to which said base station belongs;

means for setting said base station as a slave base station which transmits and receives a common control signal with a personal station using said frequency channel occupied by said pilot signal, without transmitting any pilot signal, when said pilot signal discriminating means determines that the pilot signal of the mobile radio communication system has been received; and means for setting said base station as a master base station, said master base station selecting one frequency channel from among said plurality of frequency channels and transmitting said pilot signal and said common control signal on the selected frequency channel when said pilot signal discriminating means determines that said base station has not received the pilot signal of the mobile radio communication system to which said base station belongs.

2. A system according to claim 1, wherein said system performs communications in a time division multiple transmission scheme in which the time division multiple transmission is repeated in a cycle of superframe, wherein said superframe includes a plurality of multiframes, each of said multiframes includes at least one frame, and said frame includes a pair of an odd-frame and an even-frame.

3. A system according to claim 2, wherein:

time slots in said odd-frame is used as time slots for transmitting the pilot signal from said set master base station to a personal station on a frequency channel to be occupied.

4. A system according to claim 3, wherein:

time slots in said even-frame are used as time slots for transmitting and receiving said common control signal.

5. A system according to claim 4, wherein:

said even-frame has downlink slots for transmitting said common control signal from said set base station to said personal station, and uplink slots for transmitting said common control signal from said personal station to said base station.

6. A system according to claim 2, wherein said master base station setting means includes:

means for transmitting the pilot signal in at least two time slots in said odd-frame; and means for transmitting said common control signal in a time slot in an even-frame corresponding to one of said at least two time slots in which the pilot signal was transmitted by said pilot signal transmitting means and for receiving said common control signal in a time slot in the even-frame corresponding to another one of said at least two time slots.

7. A system according to claim 1, wherein said pilot signal discriminating means includes:

means for receiving a signal at a frequency selected by said frequency channel selecting means; and means for determining whether or not said received signal is said pilot signal of said mobile radio communication system.

8. A system according to claim 1, wherein said pilot signal discriminating means includes:

availability determining means for determining whether the frequency channel selected by said frequency channel selecting means is available; and self-pilot determining means for determining whether said received signal is the pilot signal transmitted from a different base station acting as a master base station in the mobile radio communication system to which said base station base station itself belongs, when said availability determining means determines that the frequency channel is not available.

9. A system according to claim 8, wherein:

said slave base station setting means comprises means for setting the base station as a slave base station, when said self-pilot determining means determines that the received signal is the pilot signal transmitted from the master base station in the mobile radio communication system to which said base station belongs.

10. A system according to claim 8, wherein:

said master base station setting means comprises means for setting the base station as the master base station, when said availability determining means determines that the frequency channel is available.

11. A system according to claim 1, further comprising availability determining means for determining whether said frequency channel is available, when said pilot signal discriminating means determines that no pilot signal is found; and wherein said master base station setting means comprises means for setting the base station as the master base station, only when said availability determining means determines that the frequency channel is available.

12. A system according to claim 1, wherein said slave base station includes:

means for confirming reception of said pilot signal;

means for detecting empty time slots for transmission based on said received pilot signal;

means for transmitting said common control signal in one of said empty time slots detected by said detecting means; and means for receiving said common control signal from any personal station in a different empty time slot detected by said detecting means.

13. A system according to claim 1, wherein said master base station setting means further includes time-out means for suspending transmission of said pilot signal and operating said frequency channel selecting means and said pilot signal discriminating means when a required time period has elapsed.

14. A system according to claim 13, wherein:

said time-out means operates every predetermined fixed time interval.

15. A system according to claim 13, wherein:

said time-out means operate at random intervals.

16. A system according to claim 1, wherein:

a frequency, which includes said plurality of frequency channels, is selected from among a plurality of frequencies, the priority order of which has been previously determined.

17. A radio communication system employing a time division multiple transmission scheme, including a plurality of personal stations and a plurality of base stations, and using a frame structure formed of superframes each comprising a plurality of multiframes, each of said multiframes comprising a plurality of time slots, wherein an arbitrary base station comprises:

means for orderly switching a plurality of mutually different carrier frequencies for each of said multiframes to repeatedly assign the carrier frequencies to each superframe; and means for transmitting and receiving a common control signal in each multiframe.

18. A radio communication system employing a time division multiple transmission scheme, including a plurality of base stations and a plurality of personal stations, wherein an arbitrary base station comprises:

frequency setting means for setting a plurality of predetermined frequencies in order;

means for detecting a carrier signal at a frequency set by said frequency setting means to check whether the frequency is available;

means for executing transmission and reception of a common control signal when said check means confirms that the frequency is available; and means for commanding said frequency setting means to set a next frequency after said transmission/reception executing means executes the transmission and reception or after said check means confirms that the frequency is not available;

wherein said commanding means commands said frequency setting means to sequentially switch the set frequency every frame for transmitting and receiving said common control signal; and wherein said executing means transmits and receives said common control signal at least twice in said frame.

19. A system according to claim 18, wherein:

said frequency setting means includes means for setting different frequencies of said plurality of predetermined frequencies in the same frame at least between mutually adjacent base stations.

* * * * *